United States Patent Office

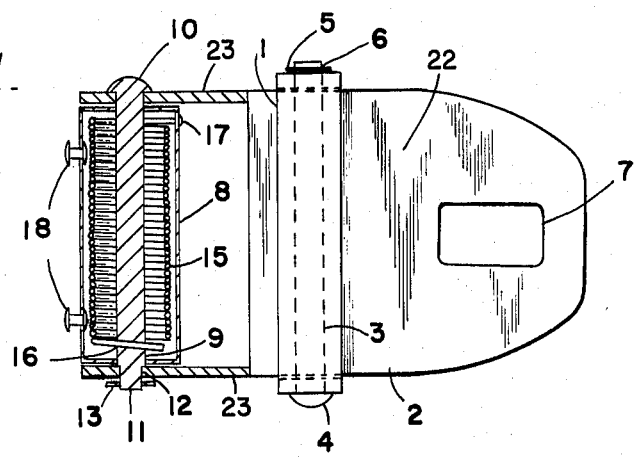
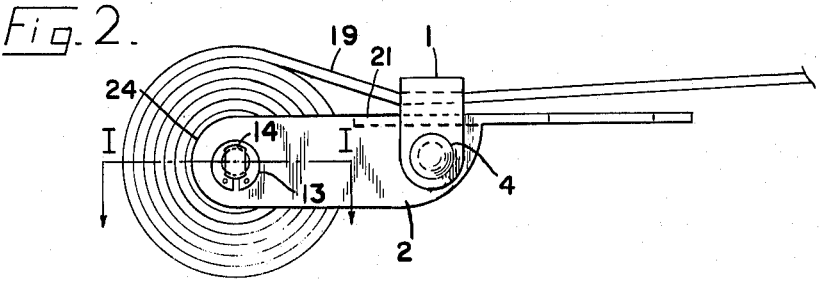
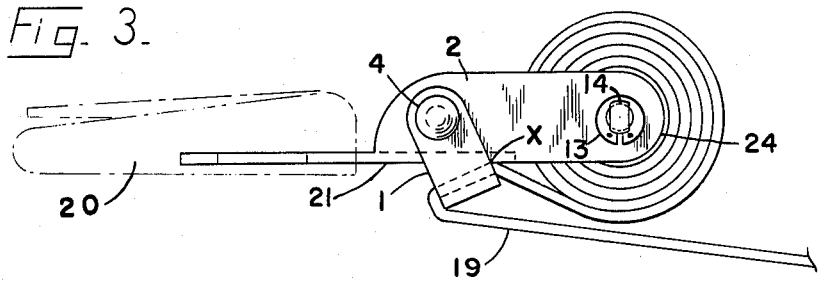
INVENTOR
Lawrence T. Taggart

3,246,929
Patented Apr. 19, 1966

3,246,929
RETRACTABLE SEAT BELTS
Lawrence T. Taggart, 3821 Fambrough Drive,
Bakersfield, Calif.
Filed Mar. 16, 1964, Ser. No. 352,168
3 Claims. (Cl. 297—388)

This invention relates to a seat belt take up and locking device.

An object of the present invention is to provide a seat belt take up device of the type which has a self-contained roller upon which the seat belt is wound, and a locking member, so that the passenger may roll off the amount of belt needed and then lock the belt against further unreeling.

A further object of the invention is to provide a seat belt retractor which will keep the seat belt rolled up and out of the way of other operations when not in use.

Another object of the invention is to provide a retractable seat belt structure which will, when fastened to a complementary buckling structure, automatically adjust to the passenger's waist size.

Still another object is to provide a retractable seat belt structure which is simple in design and therefore cheaply fabricated, and yet will meet and surpass safety regulation standards.

These and other objects will become aparent in the following detailed description and drawing in which:

FIGURE 1 is a plan view of the retractor and showing a section of the reel taken along line I—I of FIGURE 2.

FIGURE 2 is a side elevational view of the retractor.

FIGURE 3 is a side elevational view of the retractor in the belt locking position.

Referring now to FIGURE 1, the U-shaped belt locking member 1 is hinged to the main body 2 by means of the pin 3 and extends around the convex side 21 of the main body 2. The main body 2, it will be noted, is channel shaped, consisting of a main flat portion 22 with parallel channel walls 23 projecting from its sides and perpendicular to it. The pin is held in place by a flanged head 4 on one end and on the other end by a retaining ring 5 which is fitted into an annular groove 6. There is sufficient tolerance between the pin and the locking member so that the locking member will move freely on the pin. The main body 2 is provided with an aperture 7 for connection with a suitable buckle or catch. On the opposite end 24 of the main body 2 is rotatably mounted spring actuated reel 8 which is mounted on a pin 9 of circular cross section. The pin 9 has on one of its ends a flanged head 10 which abuts the main body 2. The sides of the pin 9 on the opposite end 11 are flattened, and fit into a matching hole 12 in the main body 2. This serves to secure the pin and prevent its rotation relative to the main body. The pin 9 is held in place by the retaining ring 13 which fits into the groove 14. Around the pin 9 is a spring 15. One end of the spring 15 passes through a hole 16 in the pin 9 and is therefore rigidly secured to it. The other end 17 of the spring 15 is fastened to the reel 8.

With this arrangement it will be noted that tension in the spring will tend to cause movement of the reel 8 relative to the main body 2. The rivets 18 are for the purpose of fastening the belt 19 onto the reel 8. Thus, it is seen, that by rotating the reel the tension in the spring is increased. If the belt is then fastened to the reel the spring tension may be used to wind the belt onto the reel. It is evident, then, if the belt is pulled out and caused to unwind from the reel the tension in the spring will be restored.

Referring now to FIGURE 2, the belt locking member 1, it should be noted, is hinged to the sides of the main body 2 and extends up and over the main body leaving ample space between the two for the passage of the belt 19. While the retractor is in this position (see FIGURE 2) relative to the belt, there is substantially free movement of the belt through the locking member. The roller spring, therefore, will need to be only strong enough to roll the belt onto the roller since no frictional drag must be overcome through the locking member. This will result in smooth and effortless movement by the passenger using the device.

Referring now to FIGURE 3, the belt locking member 1, due to tension on the belt 19, has been pulled back against the main body 2 clamping the belt between the two at point X. It should be noted here that the amount of pressure at point X is directly proportional to the amount of tension in the system. The FIGURE 20 in broken lines represents one of many types of fasteners by which the retractor may be secured.

In operation one end of the belt 19 anchored to the frame of the vehicle, the other end extends into the vehicle seat where it is wound onto the retractor. The retractor will normally rest on the seat in the position shown in FIGURE 2. The retractor will tend to roll up the belt and carry itself along the belt until it meets an obstruction. This obstruction will be the back rest if the belt enters between the seat and the back rest. To use the retractor the passenger will sit beside the retractor on the vehicle seat. The retractor will be situated on the seat and can be on either side of the passenger. A buckling unit, which is anchored to the frame of the vehicle, will be on the opposite side of the passenger. The passenger will grasp the retractor by its sides, drawing it up and out in the position shown in FIGURE 2, thus unwinding the belt 19, and pull it around the waist to the opposite side for connection with the buckling unit 20. It can be seen that in this semicircular path the retractor will remain in essentially the same orientation relative to the seat, that is, the connecting end of the retractor will be pointing toward the backrest. It will not be necessary, therefore, for the passenger to change the orientation of the retractor in moving it from one side to the other. After the connection of the retractor to the buckling unit, it will be seen that the retractor is in the locking position as shown in FIGURE 3. If the belt is loose and there is little or no tension in the system, the reel 8 will pull the loose belt through the locking member 1. If, however, tension is applied to the system the belt 19 will pull the locking member 1 against the belt at point X, thus preventing further unreeling. When the retractor is released from its buckling unit the tension will be reduced, and the reel may then again roll up the belt.

Although I have shown and described a specific embodiment of my invention, it should be understood that various modifications, omissions, or substitutions may be made without departing from the true concept of the invention which is pointed out in the following claims.

I claim:

1. An apertured tongue plate assembly as described, consisting of:
    a channel shaped member having an aperture near one end, a U-shaped locking member pivotally mounted to the sides of said channel shaped member and extending around the convex side of said channel shaped member, a space between the two members, in a plane parallel to the pivoted axis of said locking member for the passage of a flexible belt, the end of the assembly opposite the apertured end having a rotatably mounted spring actuated reel for the purpose of winding said belt after passing through said locking member.

2. A retractable seat belt structure consisting of:
a spring actuated reel pivotally mounted to a flat body member, a flexible belt wound on said reel and passing through a U-shaped loop hinged to said body member, means on the end opposite the reel mounted end for securing and holding said structure.

3. A device for rolling up vehicle seat belts comprising: at one end a rotatably mounted spring actuated reel upon which the free end of the seat belt is wound, said belt being wound in such a manner that the spring tension of the reel tends to roll the belt onto the reel, adjacent to said reel a generally U-shaped locking member pivotally mounted by its ends to the device so that the belt may pass between the locking member and said device; on the opposite end a means for connection to a complementary part of a buckling structure; said component parts being arranged in such a manner that when the connecting end of the device is laid against the unwound portion of the belt, the belt will pass substantially free through the locking member, and when the connecting end is rotated in the opposite direction and tension applied to the system, the unwound portion of the belt will pull the locking member against the device, clamping the belt portion therebetween.

References Cited by the Examiner

UNITED STATES PATENTS

| | | | |
|---|---|---|---|
| 837,276 | 12/1906 | Bennett | 24—193 |
| 1,962,846 | 6/1934 | St. Pierre | 24—193 |
| 1,997,653 | 4/1935 | Reiter | 24—193 |
| 2,679,670 | 6/1954 | Griswold | 297—385 X |
| 2,822,595 | 2/1958 | Ruhl | 24—193 X |
| 2,846,745 | 8/1958 | Lathrop | 297—385 X |
| 3,020,089 | 2/1962 | Monroe | 297—388 |

FRANK B. SHERRY, *Primary Examiner.*

R. B. FARLEY, *Assistant Examiner.*